Feb. 18, 1958  L. L. SIFFORD ET AL  2,823,790
PLATE CONVEYOR CONSTRUCTION
Filed July 15, 1954  2 Sheets-Sheet 1
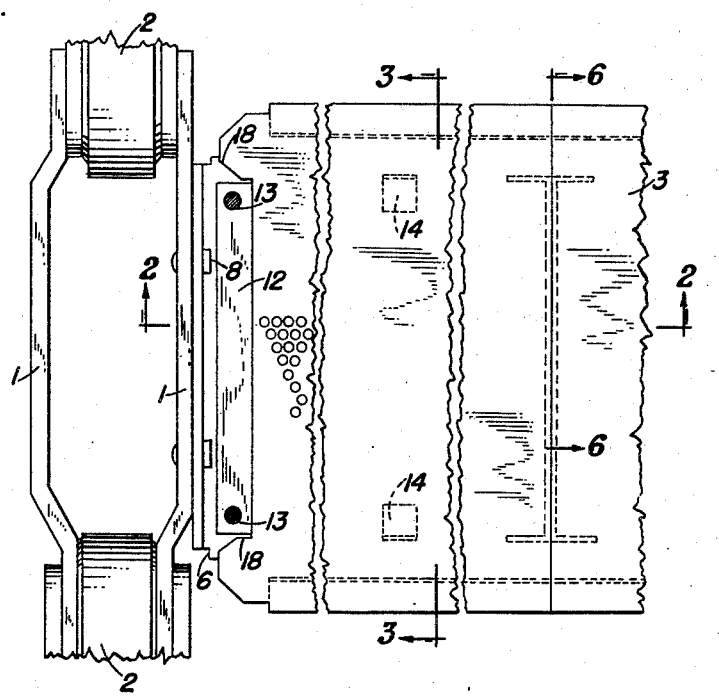
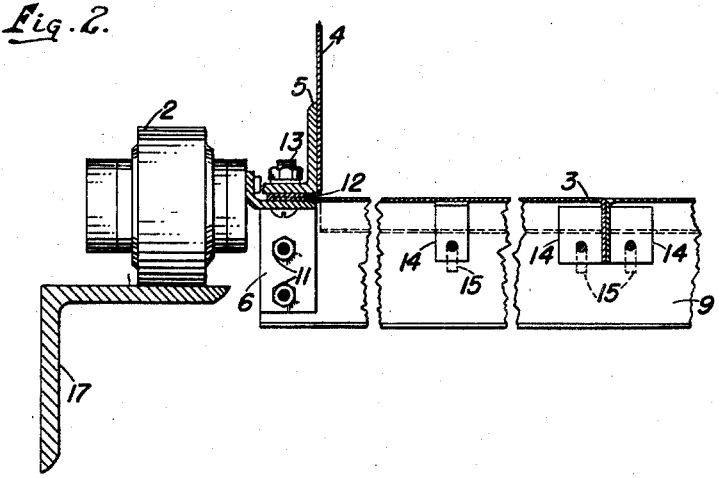
INVENTORS.
LUTHER L. SIFFORD.
EDWARD J. KITTELMAN.
BY
ATTORNEY.

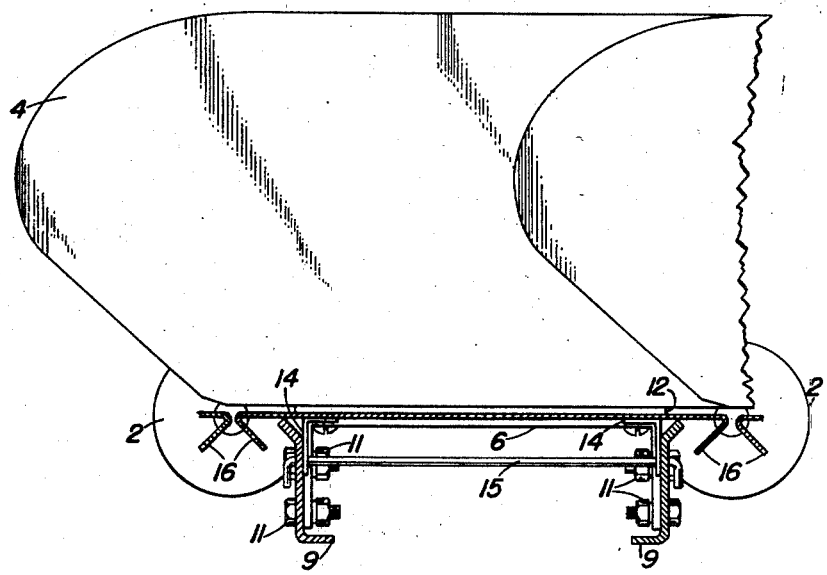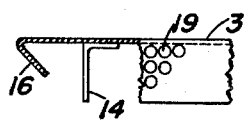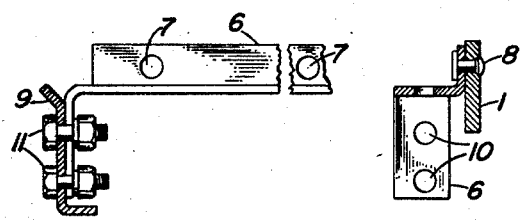

United States Patent Office 2,823,790
Patented Feb. 18, 1958

2,823,790

PLATE CONVEYOR CONSTRUCTION

Luther L. Sifford, Hamden, and Edward J. Kittelman, Wallingford, Conn., assignors to American Cyanamid Company, New York, N. Y., a corporation of Maine Application July 15, 1954, Serial No. 443,456

6 Claims. (Cl. 198—196)

This invention relates to conveyers and, more particularly, to conveyers employed as continuous dryers during the drying of thermosetting resin impregnated fillers.

Conveyers, of course, have been used as transportation means of objects for many years. Continuous belts or chain-linked conveyers motivated by a sprocket drive or other suitable means are customarily employed. The belts or linked chains may be as long as desired and sections or plates carried by the conveyer belt or chain serve to convey the material. Inasmuch as the continuous conveyer must pivot about at least two given points, said points usually being the motivating means, only a portion of the total length of the conveyer can be used at one time to carry material. The remaining portion of the conveyer will obviously be travelling in an opposite direction and with the conveyer sections in an inverted position to that portion of the conveyer carrying the material. Thus, material deposited upon the carrying portion of the moving conveyer at a certain point is carried along by the conveyer until removed. Removal of the material from the conveyer may be done either automatically or manually. In a continuous conveyer the material is usually removed from the conveyer at the point at which the conveyer reverses its plane of movement as, for example, when it passes over the sprocket drive. Plows are satisfactorily used for this removal.

In the past, the plates or conveyer sections upon which the material being transported was placed were securely joined to the chains of the conveyer by means of bolts, rivets and the like. While conveyers having the conveyer section permanently secured to the conveyer chain are satisfactory for general operations, such conveyers are not satisfactory when a conveyer is used for the continuous drying of a thermosetting resin impregnated filler. In operations where continuous drying is effected, a resin impregnated filler is deposited upon the conveyer sections and the material then passed through a dryer or oven wherein the excess moisture and other volatiles are removed from the material. As is customary, conveyers used in continuous dryer operations are perforated to allow passage of heat and air through the conveyer sections and through the material being dried. The material exiting from the dryer is then treated in accordance with procedures well known in the art to form resinous molding compositions. However, as the resin impregnated material passes through the dryer, a certain amount of the resin will, due to the heat of the dryer and also due to the force of gravity, seep or flow from the impregnated material. Although the amount of resin that may seep or flow from the material is a minor amount, after many passages of the conveyer through the oven, the total amount of resinous composition will understandably amount to a sizable sum. The heat of the oven is such that the minor amount of resinous material seeping or flowing from the resin impregnated material will cure as the conveyer passes through the oven. After a plurality of passes of the conveyer through the oven, the amount of resinous material has built up in the perforations of the conveyer section to such an extent that passage of heat and air through the conveyer section is substantially reduced or eliminated. In the event that the conveyer sections become completely clogged due to the formation of the cured resinous compositions in the perforations, it is then necessary to remove the conveyer sections or plates and clean them in order to obtain optimum drying efficiency. Inasmuch as the conveyer sections or plates were permanently secured to the conveyer chains in prior art conveyers, it was necessary to shut down the drying operation and remove the conveyer sections in order to clean them since the cured resinous material deposited in the perforations of the plate could not be removed by a simple washing or scrubbing operation. The usual procedure for cleaning the conveyer sections was to first run the conveyer through the oven maintained at an increased temperature. This heat tended to burn or carbonize the resin deposit. After the resin deposit had been burned or carbonized, it was then necessary to remove the individual conveyer sections and manually clean them as by scrubbing with a wire brush or the like. A typical cleaning operation of the sections of a dryer required as much as several days in order to remove the resin deposits, reassemble the conveyer and again start the drying operation.

The present invention is directed to a conveyer which does not have the conveyer sections or plates permanently attached to the conveyer chains. The conveyer sections are preferably constructed in two portions, each portion being substantially one-half the total distance between the spaced parallel longitudinally extending chain links. The conveyer sections are attached to the chain, as will be discussed more fully hereinbelow, by a wire or other fastening means that is easily removable. Inasmuch as the fastening means utilized to hold the conveyer sections to the conveyer as it rotates is easily removable and also in view of the fact that the conveyer section is constructed in two portions, the conveyer sections may be removed from the conveyer as it is in motion. Replaceable conveyer sections may then be assembled on the conveyer and secured thereto as the conveyer moves. It is not necessary to shut down the drying operation during the removal and cleaning of the clogged conveyer sections.

Specific details of the invention are shown in the accompanying drawings in which:

Figure 1 is a top plan view of the conveyer of our invention with the guard removed;

Figure 2 is a side view of the conveyer looking along the lines of 2—2 of Figure 1;

Figure 3 is a front view looking along the lines 3—3 of Figure 1;

Figure 4 is a view of the chain bracket with the girt attached thereto;

Figure 5 is a view showing the connection of the chain bracket to the chain link; and Figure 6 is an enlarged view looking along the lines 6—6 of Figure 1.

Referring now to the figures of the drawing, it being understood that only a portion of the total width of the conveyer is disclosed in Figure 1, inasmuch as the remaining portion is a mirror image of that shown, the spaced parallel longitudinally extending chain links 1 are connected by pivots or other means to the chain runners 2. Chain brackets 6 are attached to the inside bar of each chain link, as shown in Figure 5. The chain bracket may have holes 7 cut therein in order to facilitate the attachment of the chain bracket to the chain link. A convenient method of attaching the chain bracket to the chain link is by means of rivets, as shown at 8 in Figure 5. Other well known means may also be used if desired. The chain bracket may also contain cutouts 10, as shown in Figure 5, for conventional bolts to be inserted in order to secure the girt 9 thereto. The girt 9 extends transversely across the width of the conveyer section 3 of the continuous belt and is conveniently bent in the upper portion in order to provide a line contact with the conveyer section. The lower portion of the girt is conveniently turned inwardly, as will be seen from examination of Figures 3 and 4. In the assembly of the continuous belt the chain bracket is first secured to the chain link. A spacer bar 12 is next placed on the chain bracket 6, as shown in Figure 1. Next, the guard 4 is placed on the spacer bar and conventional bolts, as shown at 13, are employed to secure the guard 4 and spacer bar 12 to the chain brackets 6 which has previously been secured to the chain link 1. The guard 4 is conveniently welded to a guard bracket 5, as shown in Figure 2. The conveyer sections 3 are now ready for assembly onto the continuous chain. The conveyer section does not extend across the total width of the distance from chain bracket to chain bracket but is preferably constructed in two separate sections. Each of the sections may be approximately one-half the width of the distance between the chain brackets. From an examination of Figure 1 of the drawing, it will be seen that the conveyer sections are cut out at 18 in order to allow assembly of the conveyer section. The cutout portion of the conveyer section is of such proportion that the spacer bar 12 is contained therein. The portion of the conveyer section extending beyond the cutout portion is then inserted between the top of the chain bracket 6 and the bottom of the guard bracket 5, as provided by the spacer bar 12 and as will be seen in Figures 2 and 3. No bolts, rivets or other connecting means are utilized in assembling the conveyer section to the chain bracket. In order to allow passage of air and heat through the conveyer section and through the material being dried, the conveyer section is perforated, as shown at 19. The perforations may be of any shape desired. Attention is now directed to Figure 6 wherein are shown clips 14 secured to the under portion of the conveyer section. These clips may be placed at any position on the underside of the conveyer section within the area defined by the girts 9. The clips 14 and the girt 9 are provided with aligned holes through which a wire 15 or other fastening means may be inserted. The wire 15 is inserted in the holes in the girt and clips and is of such length that it traverses the distance between the transverse girts. The end portions of the wire are then turned down, as shown in Figure 3. The conveyer section may be bent, as shown at 16, in order to add strength to the section. The width of the conveyer section is equal to the distance from diameter to diameter of the chain runners. Each conveyer section is separated from the next conveyer section on the conveyer by a distance not exceeding the cross section of the perforations 19. During the operation of the conveyer, the chain is pulled along a track or apron 17. As the continuous dryer belt moves through the oven, material carried thereon is dried. When the chain comes out of the oven, a plow may be employed to remove the dried material therefrom. A sprocket drive as is well known in the art, may be employed to motivate the continuous belt. The conveyer section of the continuous chain during its time of travel back to the point at which material is placed thereon to be dried is held in place by the wire 15 extending across the width of the distance from girt to girt. No other means are utilized to secure the conveyer section to the continuous chain. All of the load carried by the conveyer section will be applied either against the cutout portion 18 or by the clips 14 when the clips are so placed as to abut the girt 9. In order to remove the continuous section from the belt, it is only necessary to cut the wire 15 or remove the fastening means as the belt is changing its direction of travel when revolving about the sprocket drive. Each portion of the total width of the conveyer section may then be removed while the belt is in operation. Replacement sections of the conveyer section may then be placed onto the continuous chain while in motion and a new wire 15 or other fastening means then inserted through aligned holes in the girts and the clips to secure the sections to the chain. It is not necessary to stop the motion of the chain during the removal and replacement of the conveyer section and it is not necessary to disassemble the guard and chain bracket as it was prior to our invention.

The conveyer of our invention not only finds use during the drying of thermosetting resin impregnated fillers but obviously may also be used for other purposes for which conveyers find employment. It is particularly suitable for the food industry where cleanliness is essential. In other operations wherein perforated conveyer sections are used and the material being conveyed has a tendency to clog or fill the perforations, the conveyer of our invention finds particular use. Solid conveyer sections may be carried by the conveyer, if desired. In any event, the conveyer presents an advantage which allows an easy and ready removal and replacement of the conveyer sections when desired, even while the conveyer is in operation.

What is claimed is:

1. A conveyer having a pair of spaced parallel longitudinally extending linked chains and sections being substantially one-half of the width of the distance between the linked chains carried by said chains, brackets secured to said chain links, a guard member secured to said bracket, a spacer member separating said bracket from said guard member, the sections having cutout portions allowing assembly of the section with the bracket, said cutout portion being such that extended portions of the sections substantially abut the aforementioned spacer member, members transversely connecting said brackets, clips secured to the underside of said sections, said clips and said transverse member having holes in alignment and a removable fastening means for inserting in said aligned holes.

2. A conveyer having a pair of spaced parallel longitudinally extending linked chains and sections carried by said chains, brackets secured to said chain links, a guard member secured to said bracket, a spacer member separating said bracket from said guard member, the sections having cutout portions allowing assembly of the section with the bracket, said cutout portion being such that extended portions of the sections substantially abut the aforementioned spacer member, members transversely connecting said brackets, clips secured to the underside of said sections, said clips and said transverse member having holes in alignment and a removable fastening means for inserting in said aligned holes.

3. A conveyer having a pair of spaced parallel longitudinally extending linked chains and sections being substantially one-half of the width of the distance between the linked chains carried by said chains, brackets secured to said chain links, a guard member secured to said bracket, a spacer member separating said bracket from said guard member, the sections having cut out portions allowing assembly of the section with the bracket, said cutout portion being such that extended portions of the sections substantially abut the aforementioned spacer member, members transversely connecting said brackets, clips secured to the underside of said sections, said clips and said transverse members having holes in alignment and a removable fastening means traversing the distance between the aforementioned transverse members longitudinally inserted in said aligned holes.

4. A conveyer having a pair of spaced parallel longitudinally extending linked chains and sections being substantially one-half of the width of the distance between the linked chains carried by said chains, brackets secured to said chain links, a guard member secured to said bracket, a spacer member separating said bracket from said guard member, the sections having cut out portions allowing assembly of the section with the bracket, said cutout portion being such that extended portions of the sections substantially abut the aforementioned spacer member, members transversely connecting said brackets, clips secured to the underside of said sections, said clips and said transverse members having holes in alignment and a removable fastening means longitudinally inserted in said aligned holes to secure the sections to the linked chains.

5. A conveyor having a pair of spaced parallel longitudinally extending linked chains, means for motivating said chains, sections carried by said chains and removable therefrom while in motion, brackets secured to said chain links, a guard member secured to said bracket, a spacer member separating said bracket from said guard member, the sections having cut out portions allowing assembly of the section with the bracket, said cutout portion being such that extended portions of the sections substantially abut the aforementioned spacer member, members transversely connecting said brackets, clips secured to the underside of said sections, said clips and said transverse member having holes in alignment and a removable fastening means for inserting in said aligned holes.

6. A conveyer having a pair of spaced parallel longitudinally extending linked chains, means for motivating said chains, sections being substantially one-half the width of the distance between the linked chains carried by said chains and being removable therefrom while in motion, brackets secured to said chain links, a guard member secured to said brackets, a spacer member separating said bracket from said guard member, the sections having cutout portions allowing assembly of the section with the bracket, said cut out portion being such that extended portions of the sections substantially abut the aforementioned spaced member, members transversely connecting said brackets, clips secured to the underside of said sections, said clips and said transverse member having holes in alignment and a removable fastening means for inserting in said aligned holes.

References Cited in the file of this patent
UNITED STATES PATENTS

| | | |
|---|---|---|
| 1,758,397 | Harber | May 13, 1930 |
| 1,800,432 | Buck | Apr. 14, 1931 |
| 1,883,528 | Buck | Oct. 18, 1932 |